(No Model.)
E. NIEHOFF.
EGG PUZZLE.
No. 491,021. Patented Jan. 31, 1893.
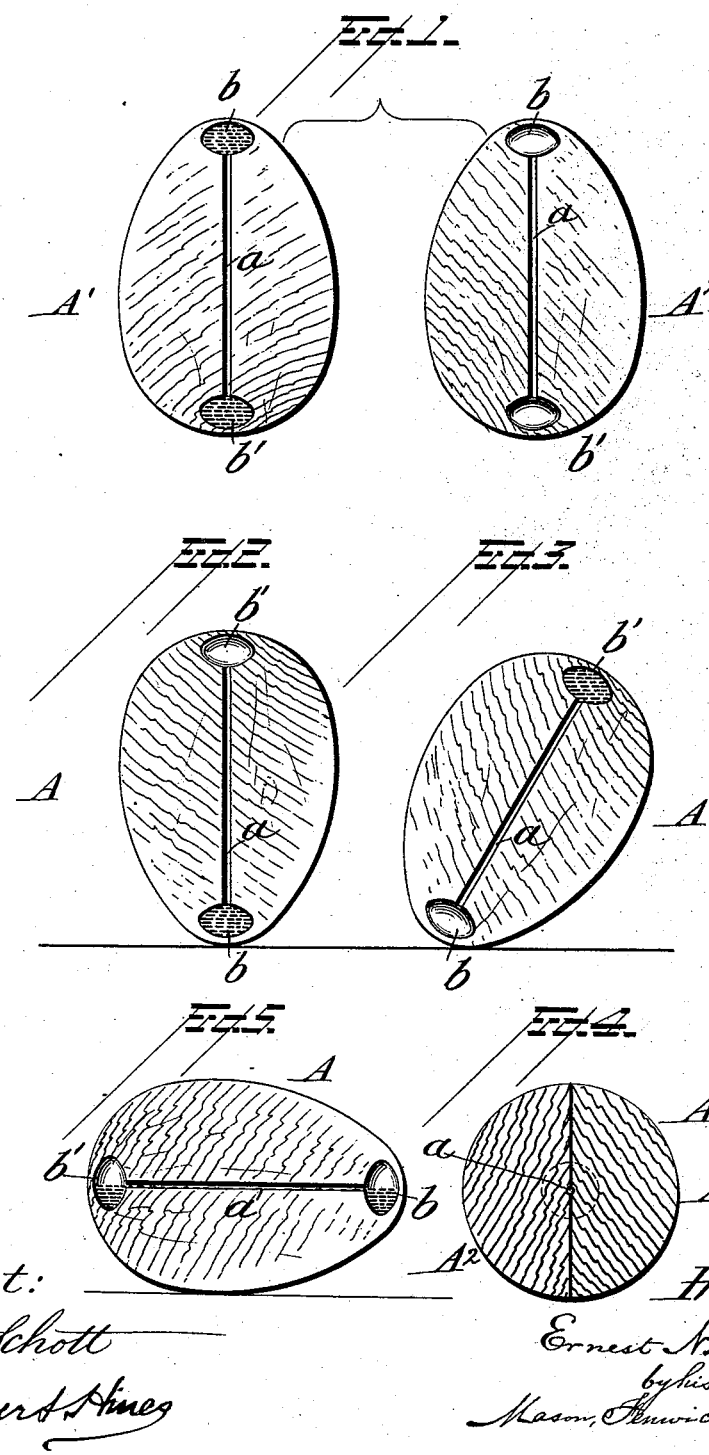
Attest:
F. H. Schott
C. Calvert Hines
Inventor
Ernest Niehoff
by his Attorneys
Mason, Fenwick and Lawrence

UNITED STATES PATENT OFFICE.

ERNEST NIEHOFF, OF TACOMA, WASHINGTON.

EGG-PUZZLE.

SPECIFICATION forming part of Letters Patent No. 491,021, dated January 31, 1893.

Application filed October 4, 1892. Serial No. 447,786. (No model.)

*To all whom it may concern:*

Be it known that I, ERNEST NIEHOFF, a citizen of the United States, residing at Tacoma, in the county of Pierce and State of Washington, have invented certain new and useful Improvements in Egg-Puzzles; and I do hereby declare the following to be a full, clear, and exact description of the invention, such as will enable others skilled in the art to which it appertains to make and use the same.

My invention relates to "Columbian" puzzle eggs, and consists in a novel manner of constructing such eggs, whereby their cost is lessened and their operation rendered very interesting and puzzling to those manipulating them.

In the accompanying drawings, Figure 1 represents the halves of an egg separated, and as seen on their inner matching faces. Fig. 2 is a vertical central section of the egg, the halves being united and having the quick silver inclosed between them, the quick silver being in position for insuring the standing of the egg on its point. Fig. 3 is a similar view to Fig. 2, the quick silver being in position for rendering the egg heaviest at its butt. Fig. 4 is a transverse section of the egg shown in Fig. 3. Fig. 5 is a section of the egg while lying on its side, the quick silver being in position for balancing the egg on its side.

A represents a solid egg made in two halves, A' A², of paper stock, or constructed of solid wood. In each of the halves a semi-cylindrical channel $a$ and two elliptical concavities $b$ $b'$ are formed, said concavities being in communication with the semi-cylindrical channels. One of the halves thus constructed has its channel and concavity filled with quick silver, and the other half is then glued to the half supplied with quick silver so as to hermetically seal the quick silver in the egg. The quantity of quick silver supplied in the egg is just sufficient to fill one of the elliptical chambers, when the two elliptical concavities $b$ $b'$ are united to form an elliptical chamber. It is very important to have the channel very small in diameter so as to prevent the mercury running down too rapidly.

The game with this egg is played as follows: One acquainted with the secret, viz, that the quick silver must be at the point of the egg in order to balance it on its point, takes the egg in his hand and allows the quick silver to settle in the chamber at its point, and then says, "I can make this egg stand on its end;" and, being challenged that he cannot do it, immediately performs the trick by setting it on its point and leaving it standing in that position. His competitor, seeing how simple it is, says: "I can do that." Thereupon the person in the secret takes the egg in his hand and allows the quick silver to settle at the butt, and quickly hands it to his competitor, who, in his excitement, instantly places it on its point, and, to his surprise, it topples over as illustrated in Fig. 3, being butt heavy. Of course, had he held the egg point downward long enough, the quick silver would have settled at the point, but in his excitement and anxiety to do the trick, the competitor does not usually wait long enough for this to occur. The same trick can be repeated by setting the egg on its butt and challenging the competitor to do the same thing. In this challenge, the person in the secret settles the quick silver from the butt to the point of the egg and passes it to his competitor, who, setting the egg on its butt, finds that it topples over.

In the trick of balancing the egg on its side, the person in the secret adjusts the quick silver on a level, and, having balanced the egg on its side, challenges his competitor to do the same, but, previously to passing the egg to his competitor, settles the quick silver at either the point or butt, and, on the competitor trying to perform the trick, the egg tilts either toward its point or butt.

What I claim as my invention is:—

The within described toy puzzle egg, consisting of an egg formed of hermetically united halves, each half constructed with a semi-cylindrical channel, and two end, communicating concavities, the halves, when united, forming a cylindrical channel and two communicating end chambers; and a sufficient quantity of quick silver to fill one or the other of the chambers at the point or butt of the egg, substantially as described.

In testimony whereof I hereunto affix my signature in presence of two witnesses.

ERNEST NIEHOFF.

Witnesses:
ROBT. W. FENWICK,
C. CALVERT HINES.